(12) United States Patent
Pauling

(10) Patent No.: US 6,355,373 B1
(45) Date of Patent: Mar. 12, 2002

(54) BATTERY

(76) Inventor: Hans Juergen Pauling, Staffelweg 15, 75038 Oberderdingen (DE)

(*) Notice: Subject to any disclaimer, the term of this patent is extended or adjusted under 35 U.S.C. 154(b) by 0 days.

(21) Appl. No.: 09/202,725

(22) PCT Filed: Jun. 16, 1997

(86) PCT No.: PCT/EP97/03126

§ 371 Date: Dec. 21, 1998

§ 102(e) Date: Dec. 21, 1998

(87) PCT Pub. No.: WO97/50137

PCT Pub. Date: Dec. 31, 1997

(30) Foreign Application Priority Data

Jun. 21, 1996 (DE) .......................................... 196 24 883

(51) Int. Cl.[7] .............................................. H01M 2/36
(52) U.S. Cl. ............................ 429/75; 429/51; 429/81; 429/63
(58) Field of Search ........................... 429/75, 72, 74, 429/71, 61, 63, 64, 51, 50, 80, 81, 118, 163

(56) References Cited

U.S. PATENT DOCUMENTS

| | | | |
|---|---|---|---|
| 4,439,501 A | 3/1984 | Flanagan | 429/70 |
| 4,448,859 A | 5/1984 | Bishop et al. | 429/50 |
| 5,494,762 A * | 2/1996 | Isoyama et al. | 429/194 |

FOREIGN PATENT DOCUMENTS

| | | |
|---|---|---|
| DE | 369447 | 4/1981 |
| DE | 38 26 423 C1 | 3/1990 |
| EP | 0 116 960 | 8/1984 |
| EP | WO 84/03177 | 8/1984 |
| EP | WO 92/05598 | 4/1992 |
| JP | 06132040 | 5/1994 |

* cited by examiner

Primary Examiner—Stephen Kalafut
Assistant Examiner—R. Alejandro
(74) Attorney, Agent, or Firm—Crowell & Moring LLP

(57) ABSTRACT

The invention relates to a battery which, for maintenance or in a danger situation, can be simply and reliably transferred from an operative state into a safe, inoperative state, whilst avoiding a short circuit. This is either brought about in that a controlled operable draining device for the rapid draining of the electrolyte is provided and that following the draining of the electrolyte all power-generating processes are stopped. Alternatively a battery with such characteristics is created in that in the danger situation a line introduces a deactivating substance into the electrolyte, which stops all power-generating, electrolytic processes.

17 Claims, 3 Drawing Sheets

BATTERY

BACKGROUND AND SUMMARY OF THE INVENTION

This application claims the priority of German application No. 196 24 883.3 and PCT/EP97/03126, filed Jun. 21, 1996 and Jun. 16, 1997, respectively, the disclosures of which are expressly incorporated by reference herein.

The invention relates to a battery which during maintenance or danger can be easily and safely converted from an operative status to an inactive status thereby avoiding short-circuiting.

Batteries and battery systems are becoming increasingly important for primary and secondary power supply purposes. This increasing importance is in part due to the ever increasing demands in connection with the environmental compatibility of power supply systems in the sense of emission protection and reusability or recyclability of raw materials and energy.

This primarily applies to the final consumer and consequently private households. But also applies to public installations, more particularly with regards to infrastructure and affix which is being equipped with more environmentally compatible power sources.

Mobile equipment, such as e.g. road vehicles and also rail vehicles and watercraft are already being equipped with environmentally friendly and reusable or rechargeable power sources in the form of accumulators or batteries. In addition, ever greater use is being made of such power sources in the form of battery systems in stationary installations, such as e.g. standalone devices or as emergency power sources in buildings.

In general, with all power sources and power supply means, the problem exists that the release of power is desirable in the normal operating state, but in the case of an accident, danger or damage, or also in the case of maintenance work, it is necessary to achieve a very fast and clearly defined disconnection of the power source or power supply.

For example, in the case of internal combustion engines the battery is transferred from an operative state into an inoperative state by switching off the ignition and by interrupting the fuel supply the engine. Thereafter no power is released, apart from any residual heat. However, in the case of batteries or battery systems the difficulty exists that even after the separation or interruption of the supplying leads, the battery or battery system still generates power. There is still the terminal voltage at the battery or battery system terminals in the form of the no load or open-circuit voltage of the battery.

Thus, in the case of an electric car, if an accident occurs, an emergency cutout reacting to the impact interrupts all leads to the power supply. However, due to the deformation of the vehicle on impact an electric contact may be formed between the battery terminals and conductive parts of the vehicle, particularly the vehicle body. As such, there is a risk of an electric shock for persons hurrying to recover the wreck or assist the occupants.

In addition, by deformation of the battery compartment even the battery can be short circuited. As a result, in certain circumstances, considerable current may still flow, accompanied by sparking. There is a considerable fire risk at the accident location, which can lead to a great increase in dangers and risks for objects or persons.

Therefore an object of the invention is to provide a battery which, for maintenance purposes or in the case of a hazard, can be simply and reliably transferred from an operative state to a safe inoperative state, while avoiding a battery short circuit.

The object of the present is achieved in that a battery is created having at least one controlled operable rapid draining device. This rapid draining device is used for the rapid draining of the electrolyte from the electrolyte compartment. According to this solution, following the draining of the electrolyte, the electrodes remain completely or substantially unwetted by the electrolyte. As such, the electrodes are galvanically isolated from one another.

Compared with the prior art, these inventive measures have the advantage that in the case of a danger or maintenance situation, the battery can be transferred in a controlled and clearly defined manner into a safe, inoperative state. After draining the electrolyte and consequently after the galvanic interruption of the electrode connection, all the current-generating, electrochemical processes of the battery are interrupted. Even if the battery compartment is deformed and the battery terminals come into contact with any conductive areas, no electric shock hazard exists, because in this inoperative state the battery cannot generate electricity.

In the simplest case the electrolyte simply flows out of the electrolyte compartment. However, for environmental compatibility and electrolyte reusability reasons, it is appropriate to provide at least one electrolyte collecting tank for receiving at least part of the electrolyte from the electrolyte compartment. The electrolyte can be safely drained so that the environment is not contaminated. In addition, following the elimination of the hazard or at the end of the maintenance work, the electrolyte can be returned to the electrolyte compartment to reactivate the battery.

A particularly preferred battery system with a high battery capacity is obtained if the electrolyte compartment has a reaction compartment with electrodes and a reservoir communicating with the reaction compartment for receiving a larger electrolyte supply. It is particularly advantageous for the reaction chamber to have a small volume compared with the reservoir. The small reaction chamber is then faced by a very large electrolyte reservoir, so that the battery system acquires a particularly large capacity, which greatly increases the travel range for electric vehicles. In addition, compact and/or non-porous electrodes are advantageous.

Communication between the reaction chamber and the reservoir is advantageously provided by an exchange line. In a particularly simple manner of use, convection, which is produced as a result of the density difference between the used and unused electrolyte is used. In order to increase convection and therefore the electrolyte exchange between reaction chamber and reservoir, there is at least one pump or a stirring, circulating or heating device. This device can be positioned either in the exchange line, in the reaction compartment or in the reservoir.

A particularly simple draining of the electrolyte from the electrolyte compartment into the electrolyte collecting tank is achieved if the electrolyte collecting tank is arranged substantially below the electrolyte compartment. Gravity then spontaneously drives the electrolyte downwards into the electrolyte collecting tank. It is advantageous to provide an electrically controllable closing or sealing device in the rapid draining device for the rapid draining of the electrolyte. This prevents electrolyte flow between the electrolyte compartment and the electrolyte collecting tank, in particular the draining of the electrolyte in at least one direction. This prevents an outflow of electrolyte in the normal operating state and ensures that when the electrolyte has been drained there can be no return flow of electrolyte from the electrolyte collecting tank into the electrolyte compartment and consequently there can be no reactivation of the battery.

This closing device is advantageously constructed as on baised valve held open in the currentless state. In the normal battery operating state the open valve in the currentless state is supplied with a current and therefore kept closed. In a danger situation the current flow is interrupted in a controllable manner, so that the valve opens and the electrolyte is drained from the electrolyte compartment into the electrolyte collecting tank, deactivating the battery. Particularly simple disposable closing devices are obtained if the closing device of the rapid draining line is constructed as an explosive bolt, a preset breaking point, etc.

A further advantageous construction of the battery according to the invention is obtained by the provision of a line for delivering electrolyte between the electrolyte collecting tank and the electrolyte compartment in at least one direction. Then, following the end of the danger situation or maintenance work, the drained electrolyte can be conveyed back from the electrolyte collecting tank into the electrolyte compartment for reactivating the battery.

A further advantageous development results from the construction of at least one controlled operable delivery device for delivering the electrolyte between the electrolyte collecting tank and the electrolyte compartment. This speeds up and assists the draining of electrolyte from the electrolyte compartment. This is particularly advantageous if the electrolyte collecting tank is positioned above the electrolyte compartment or if, as a result of a danger situation, the battery system is upside down due to the accident (vehicle turned over). A controlled operable delivery device of this type can also be used for returning the drained electrolyte from the electrolyte collecting tank into the electrolyte compartment.

Such a delivery device can be for example a pump, electrically operated pump. Advantageously, the delivery device may be formed of a device for the expulsion or removal of the electrolyte from the electrolyte compartment. If said expulsion device is constructed as a gas pressure cartridge, there is a particularly rapid expulsion of the electrolyte from the electrolyte compartment and consequently a further reduction in the accident risk as a result of electric shock.

A further simplification is obtained by the construction of the rapid draining device as an emergency drain opening. Alternatively, the device may be a riser or U-tube with closure parts. Emphasis is placed on the rapid draining of the electrolyte from the electrolyte compartment.

According to another embodiment the invention, the object is also achieved by a battery provided with at least one deactivating compartment separate from the electrolyte compartment and which receives a deactivating substance. In this embodiment, there is a line for connecting the electrolyte compartment to a deactivating compartment. There is also a delivery device for the controlled transfer of the deactivating substance from the deactivating compartment into the electrolyte compartment. The deactivating substance is chosen in such a way that it prevents, deactivates or at least limits to a safe level all current-generating electrochemical or electrolytic processes in the electrolyte compartment.

Also in the case of this embodiment according to the invention, the prior art problem, that following damage, the power source still carries latent energy, is addressed in that the actual power or energy-supplying process is stopped. In this case this is brought about by the power-generating processes being suppressed by adding a substance to the electrolyte.

The deactivating substance can be in the form of a powder to be shot in, or as a liquid or a gas. If the deactivating substance in the deactivating compartment is under pressure, the delivery device can be constituted by a valve, which is in open in the currentless state, so that on disconnecting the power supply it opens in a danger or maintenance situation. Independently thereof or in addition thereto, the delivery device can also be a pump, which is in particular electrically controlled and operates electrically.

It is advantageous for the line to carry a check valve for preventing a return flow of the deactivated electrolyte into the deactivating compartment.

The electrolyte is advantageously constituted by an electrolyte comprising or in combination with $H_2SO_4$ or KOH or an organic electrolyte. Correspondingly, the deactivating substances are dilute lyes, particularly KOH, NaOH, etc. or saline suspensions, particularly milk of lime, etc. or powders, particularly of $CaCO_3$, oxides, etc. or their suspensions or dilute mineral acids, carbon dioxide, organic acids, particularly citric acid or the like, saline suspensions, particularly $FeCl_3$, etc. or powders of acid anhydrides or their suspensions or oxidizing or precipitating agents.

In all these batteries or battery systems according to the invention, it is particularly advantageous to provide a control device for controlling the delivery devices and/or valve means using control lines. This permits a clearly defined disconnection in the case of danger or maintenance.

A particularly easily handleable battery or battery system is obtained if the control device is designed for detecting a signal of a danger situation and/or a user activation. When the signal is detected the, draining of the electrolyte or the deactivation of the electrolyte can be initiated. The control device advantageously has at least one sensor means, which can be designed as an acceleration sensor or as a manually operable emergency cutout.

Other objects, advantages and novel features of the present invention will become apparent from the following detailed description of the invention when considered in conjunction with the accompanying drawings.

BRIEF DESCRIPTION OF THE DRAWINGS

The invention is described in greater detail hereinafter relative to preferred embodiments and with reference to the attached drawings wherein show.

DETAILED DESCRIPTION OF THE DRAWINGS

Figure 1B:
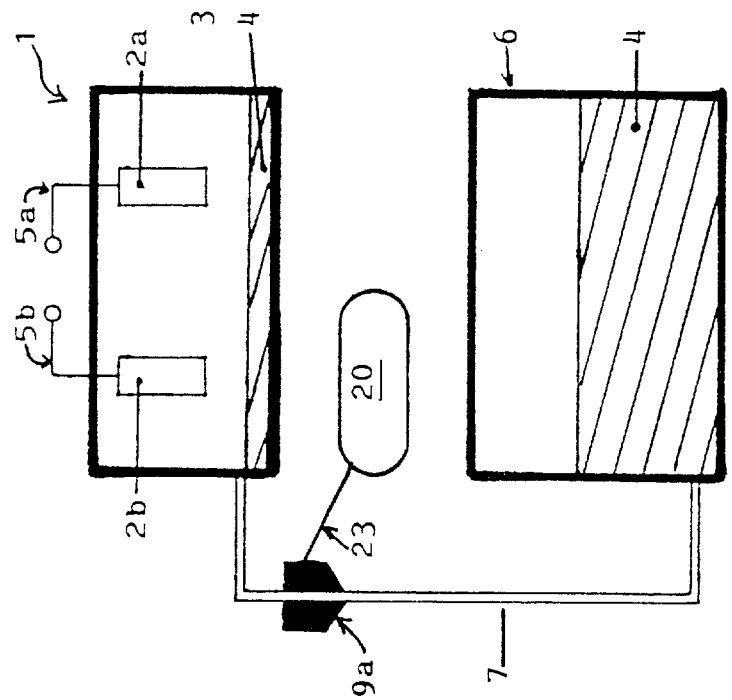
FIG. 1B A diagrammatic representation of the embodiment of FIG. 1A in the danger or maintenance state.
Figure 1A:
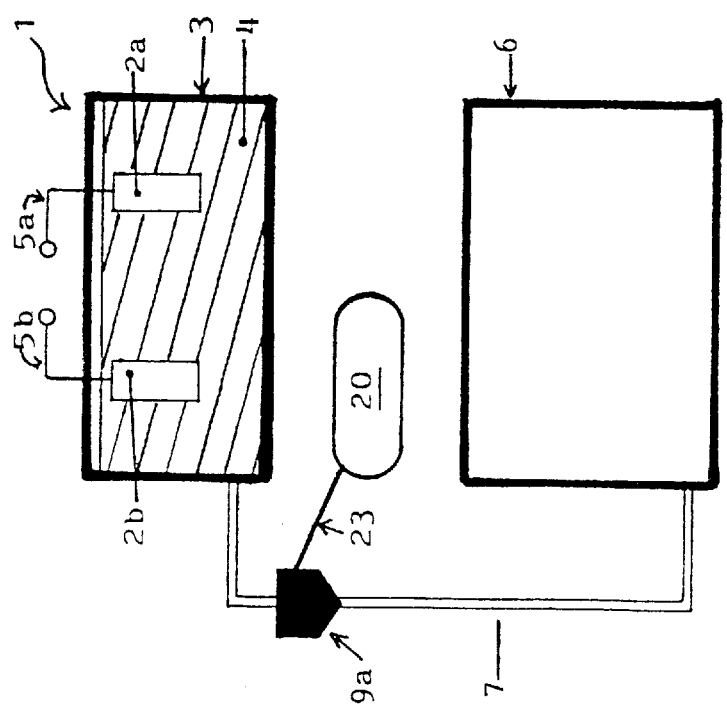
FIG. 1A A diagrammatic representation of a first embodiment of a battery according to the invention, in the normal operating state.

FIGS. 1A and 1B show the basic arrangement of the battery 1 according to the invention.

An electrolyte compartment 3 contains two electrodes 2*a* and 2*b*, which are electrically tapped by means of leads 5*a* and 5b. In this embodiment, below the electrolyte compartment 3 an electrolyte collecting tank 6 is provided. Tank 6 is linked to the electrolyte compartment 3 by means of a rapid drain line 7. The rapid drain line 7 as shown has a closing element 9a in the form of a valve controlled by a control device 20 by a control line 23.

FIG. 1A shows the battery in the normal operating state. The electrolyte 4 located completely within the electrolyte compartment 3 and keeps the electrodes 2a, 2b completely wetted and in direct galvanic contact with one another. As a result of the electrochemical processes which then take place, electric power is generated and can be tapped to the outside by means of the leads 5a, 5b.

FIG. 1B shows the battery system of FIG. 1A activated by a danger situation where the control device 20 has opened the valve 9a. As result of gravity, the electrolyte 4 has flown out of the electrolyte compartment 3 to a minimum fill level into the electrolyte collecting tank. The minimum fill level in this case results from the arrangement of the rapid draining device in the form of the line 7 on the electrolyte compartment 3. This minimum fill level is chosen in such a way that when the electrolyte 4 has been drained, the electrodes 2a, 2b are not wetted by the electrolyte 4 and are no longer in direct galvanic contact with one another. As such no electric power can be tapped on the outside via leads 5a and 5b.

Figure 2:
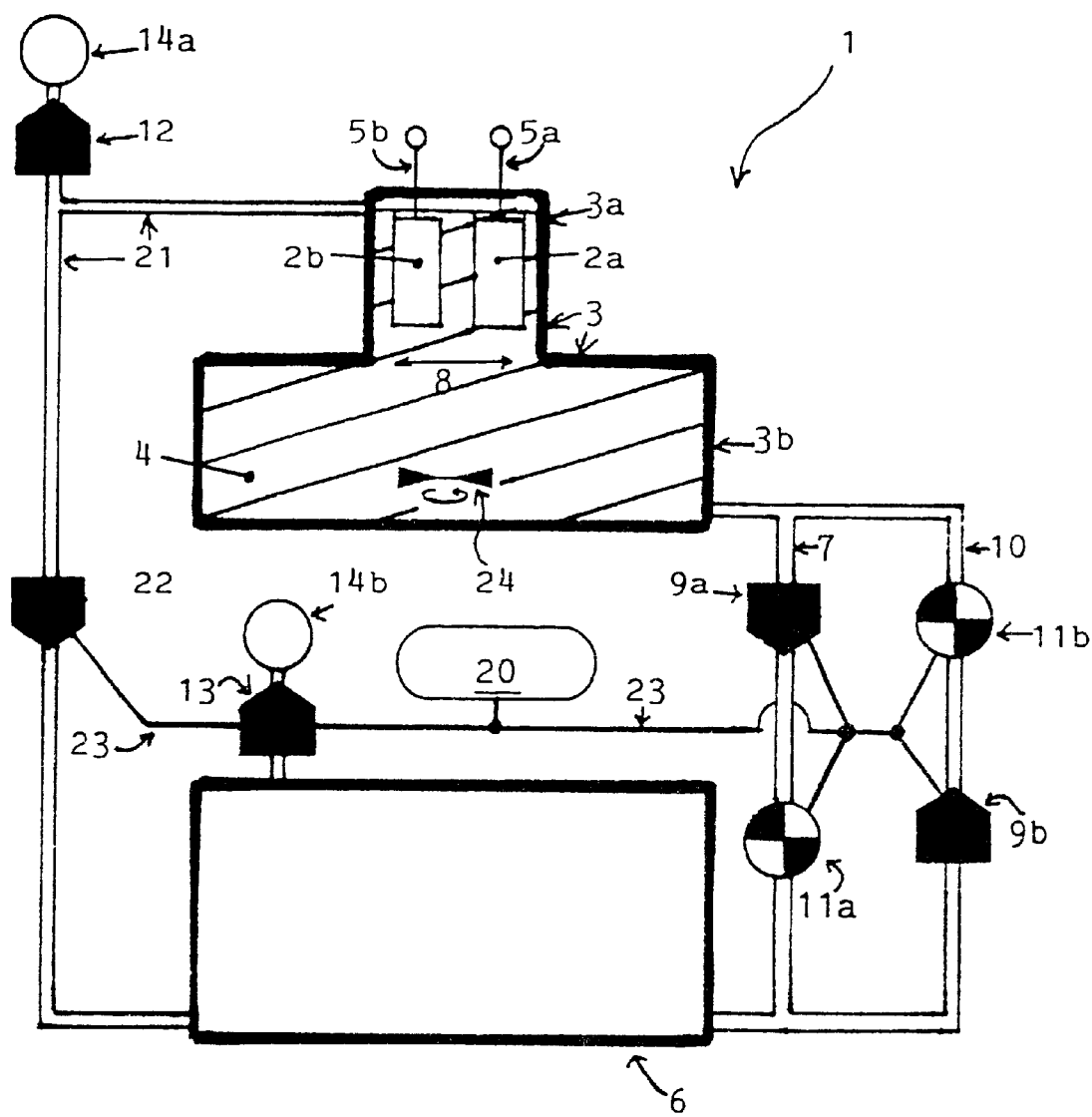
FIG. 2 A diagrammatic representation of a second embodiment of the battery according to the invention.

The embodiment according to FIG. 2 is another arrangement of the battery 1 according to the invention in the normal operating state. The battery compartment 3 is here subdivided into a reaction compartment 3a and a reservoir 3b. The reaction compartment 3a is of small volume compared with the reservoir 3b. The electrodes 2a, 2b are contained completely within reservoir 3b.

The electrolyte compartment 3 is completely filled with electrolyte in accordance with the normal operating conditions up to a maximum fill level, which is defined by the overflow line 21 located on the reaction compartment. The overflow line 21 is used for electrolyte overflow on delivering back the electrolyte 4 following draining. Below the electrolyte compartment 3 is positioned the electrolyte collecting tank 6 and is connected by means of a rapid draining device 7, in the form of line 7, to the electrolyte compartment 3. The rapid drain line 7 has a valve 9a, which is open in the currentless state and is closed in the operating state. A first delivery device 11a is formed in the line 7 and assists the gravity-driven flow of electrolyte 4 from electrolyte compartment 3 into electrolyte collecting tank 6 when the valve 9a is open.

For returning the electrolyte 4 from the electrolyte collecting tank 6 into the electrolyte compartment 3 is formed a further line 10, which has a valve 9b and a pump or some other delivery device 11b.

It is also conceivable for the lines 7 and 10 or the valves 9a, 9b and the delivery device 11a, 11b to be in the form of a single line used for draining and returning the electrolyte 4.

Both the electrolyte compartment 3 and the electrolyte collecting tank 6 can have devices for absorbing an overpressure. In FIG. 2, these devices are shown as valves 12 and 13 with collecting tanks 14a, 14b positioned behind them.

By means of control lines 23, the control device 20 is constructed for controlling all the valves 9a, 9b, 12, 13 and 22 and the delivery devices 11a and 11b.

The exchange or interchange between the reaction compartment 3a and reservoir 3b of the electrolyte compartment 3 takes place by means of the exchange line 8. In the embodiment of the inventive battery shown in FIG. 2, it is constituted simply as a connecting opening 8 with a large cross-sectional surface. The convection of the electrolyte between the reaction compartment 3a and the reservoir 3b can be aided by a circulating device 24, which can also be operable in controlled manner by the control device 20.

Figure 3:
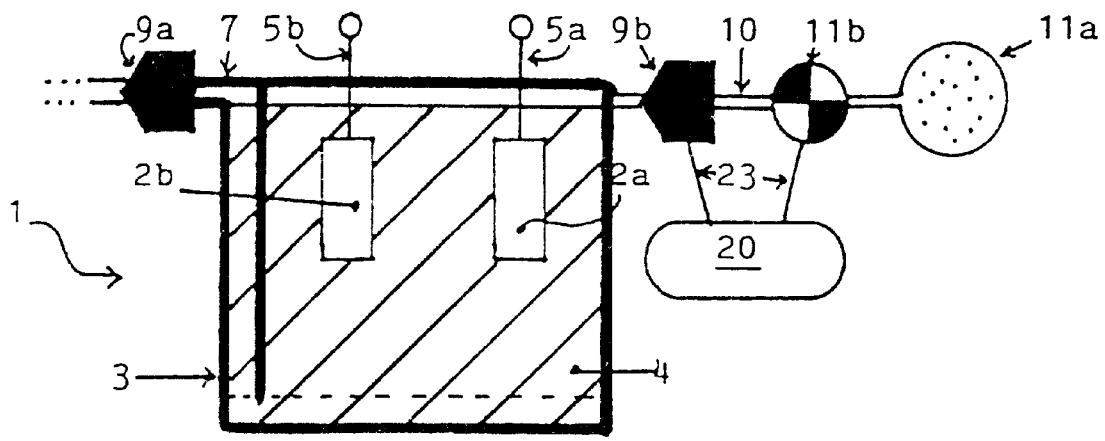
FIG. 3 A diagrammatic representation of a third embodiment of the battery according to the invention.

FIG. 3 diagrammatically shows an embodiment of the inventive battery in the operating state, the draining of electrolyte 4 from the electrolyte compartment 3 here taking place by expulsion.

By delivery devices 11a and 11b in a delivery line 10 a gas, which is contained in the delivery device 11a, particularly a pressure cartridge, is introduced in controlled manner into the electrolyte compartment 3 by means of a valve 9b. The gas expels the electrolyte 4 from an upper gas zone through a U-tube 7 and a valve 9a. When the gas has been completely introduced in a danger situation the electrodes 2a and 2b are not wetted by the electrolyte 4.

A return flow can be prevented by constructing the valve 9a as a check valve. Here again the entire control takes pidce by means of a control device 20 via control lines 23.

Figure 4:
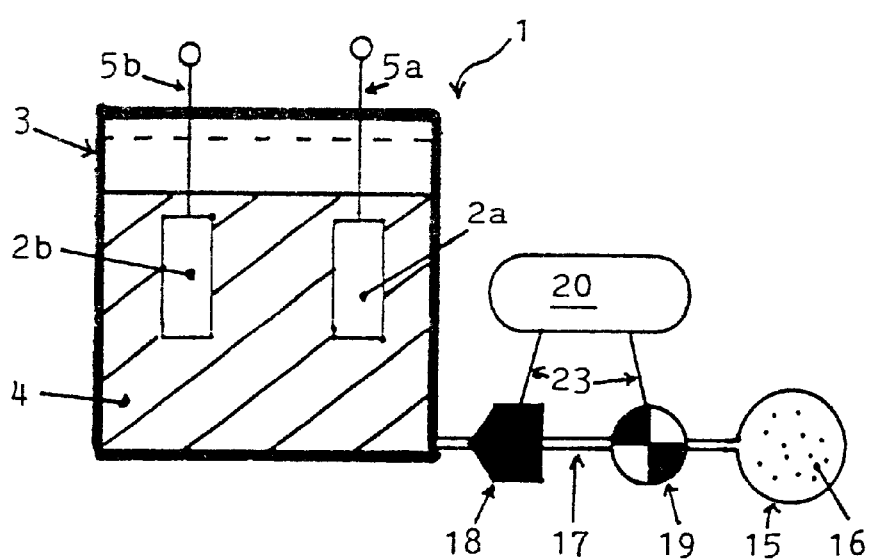
FIG. 4 A fourth embodiment of the battery according to the invention.

FIG. 4 shows an embodiment according to another operating principle of the battery according to the invention. Interruption of the power-generating processes takes place in a controlled manner by deactivating the electrodes 2a and 2b of electrolyte 4 by introducing a deactivating substance 16 from a deactivating compartment 15 via a feed line 17 by means of delivery device 19 and valve device 19 and valve device 18.

Here again the controlled prevention of power generation is brought about by the control device 20 by means of control lines 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A battery comprising:
   at least two electrodes in a first electrolyte compartment which, in an operating state of the battery, is filled with a liquid electrolyte that wets substantially the entire surfaces of the electrodes and are thereby in direct galvanic contact with one another;
   an electric tap on the electrodes;
   a second electrolyte compartment filled with electrolyte and positioned below said first compartment;
   a connecting opening between said first and second compartment;
   at least one controlled operable rapid draining device adapted to drain the electrolyte from the first and second electrolyte compartments;
   wherein, following draining of the electrolyte from the first compartment, the electrodes are not wetted by electrolyte and are galvanically isolated from one another, and wherein the first electrolyte compartment is smaller than the second compartment to facilitate speed of removal of electrolyte from the first compartment.

2. The battery according to claim 1, further comprising at least one electrolyte collecting tank for receiving at least part of the electrolyte from the first and second electrolyte compartments.

3. The battery according to claim 1 wherein the second compartment has a substantially larger volume than the first compartment.

4. The battery according to claim 1 further comprising an exchange line provided for convective electrolyte exchange between the first compartment and the second compartment.

5. The battery according to claim 4, further comprising a device adapted to pump, stir, circulate or heat for producing the convective exchange of the electrolyte.

6. The battery according to claim 2 wherein the electrolyte collecting tank is positioned substantially below the first and second electrolyte compartments.

7. The battery according to claim 1 wherein the draining device has at least one electrically controllable closing device, for preventing an electrolyte flow between the electrolyte compartments and the electrolyte collecting tank in at least one direction.

8. The battery according to claim 7, wherein the closing device is a valve held open in the currentless state and is an, explosive bolt or has a predetermined breaking point.

9. The battery according to claim 1 further comprising a line provided to deliver electrolyte between the electrolyte collecting tank and the electrolyte compartments in at least one direction.

10. The battery according to claim 1 further comprising at least one controlled operable delivery device for delivering electrolyte between the electrolyte collecting tank and the electrolyte compartments.

11. The battery according to claim 10, wherein that the delivery device is constructed as a pump for expulsion of electrolyte from the electrolyte compartments.

12. The battery according to claim 1 wherein the draining device is provided an emergency drain opening with closure part.

13. The battery according to claim 1 further comprising a control device for controlling the delivery device and/or the valve means by control lines, the control device being constructed for detecting a signal of a danger situation and/or a user activation and that when the signal is detected it is possible to initiate draining of the electrolyte or deactivation of the electrolyte.

14. The battery according to claim 13, wherein the control device has at least one sensor means which is an acceleration sensor or a manually operable emergency cutout.

15. The battery according to claim 2 wherein the second compartment has a substantially larger volume than the first compartment.

16. The battery according to claim 10 wherein the delivery device is an expulsion device.

17. The battery according to claim 16 wherein the expulsion device is a gas pressure cartridge.

* * * * *

UNITED STATES PATENT AND TRADEMARK OFFICE
CERTIFICATE OF CORRECTION

PATENT NO. : 6,355,373 B1
DATED : March 12, 2002
INVENTOR(S) : Hans Juergen Pauling It is certified that error appears in the above-identified patent and that said Letters Patent is hereby corrected as shown below:

<u>Title page,</u>
Insert list of the Assignees as:
-- Zoxy Energy Systems AG
ENBW Energie Baden-Wuerttemberg AG
Stadtwerke Karlsruhe GmbH --

Signed and Sealed this

Fifteenth Day of October, 2002

*Attest:*

*Attesting Officer*

JAMES E. ROGAN
*Director of the United States Patent and Trademark Office*